Feb. 28, 1961          H. F. LAKE          2,973,167
AIRFOIL AND BOUNDARY-LAYER CONTROL ROTOR
Filed Jan. 24, 1957          4 Sheets-Sheet 3
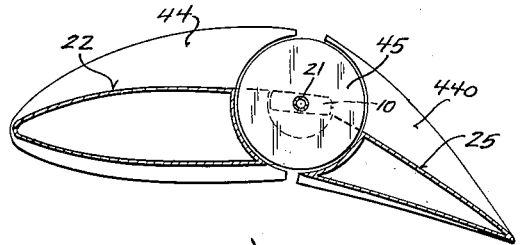
Fig. 6
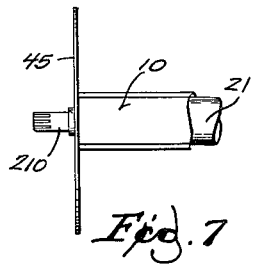
Fig. 7
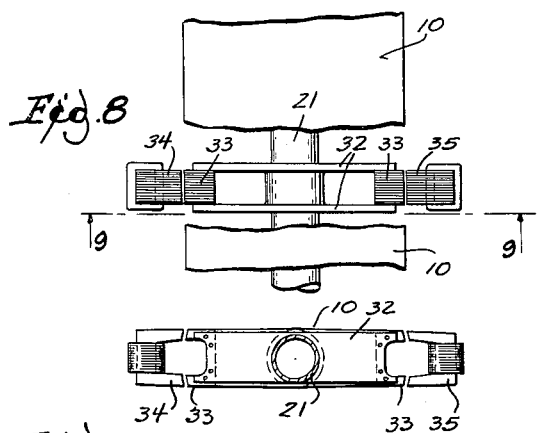
Fig. 8
Fig. 9
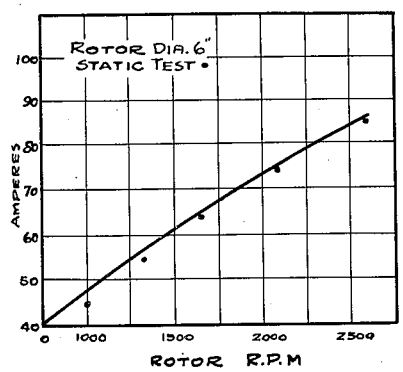
Fig. 11
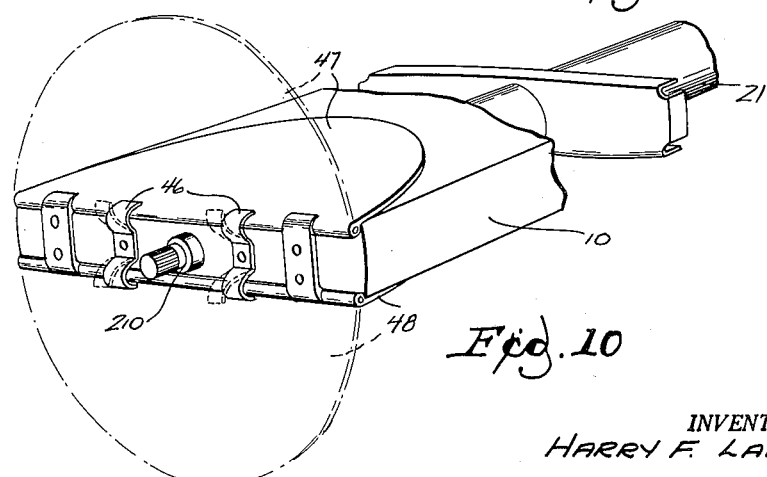
Fig. 10
INVENTOR.
HARRY F. LAKE
BY
Wheeler, Wheeler & Wheeler
ATTORNEYS Feb. 28, 1961     H. F. LAKE     2,973,167
AIRFOIL AND BOUNDARY-LAYER CONTROL ROTOR
Filed Jan. 24, 1957     4 Sheets-Sheet 4

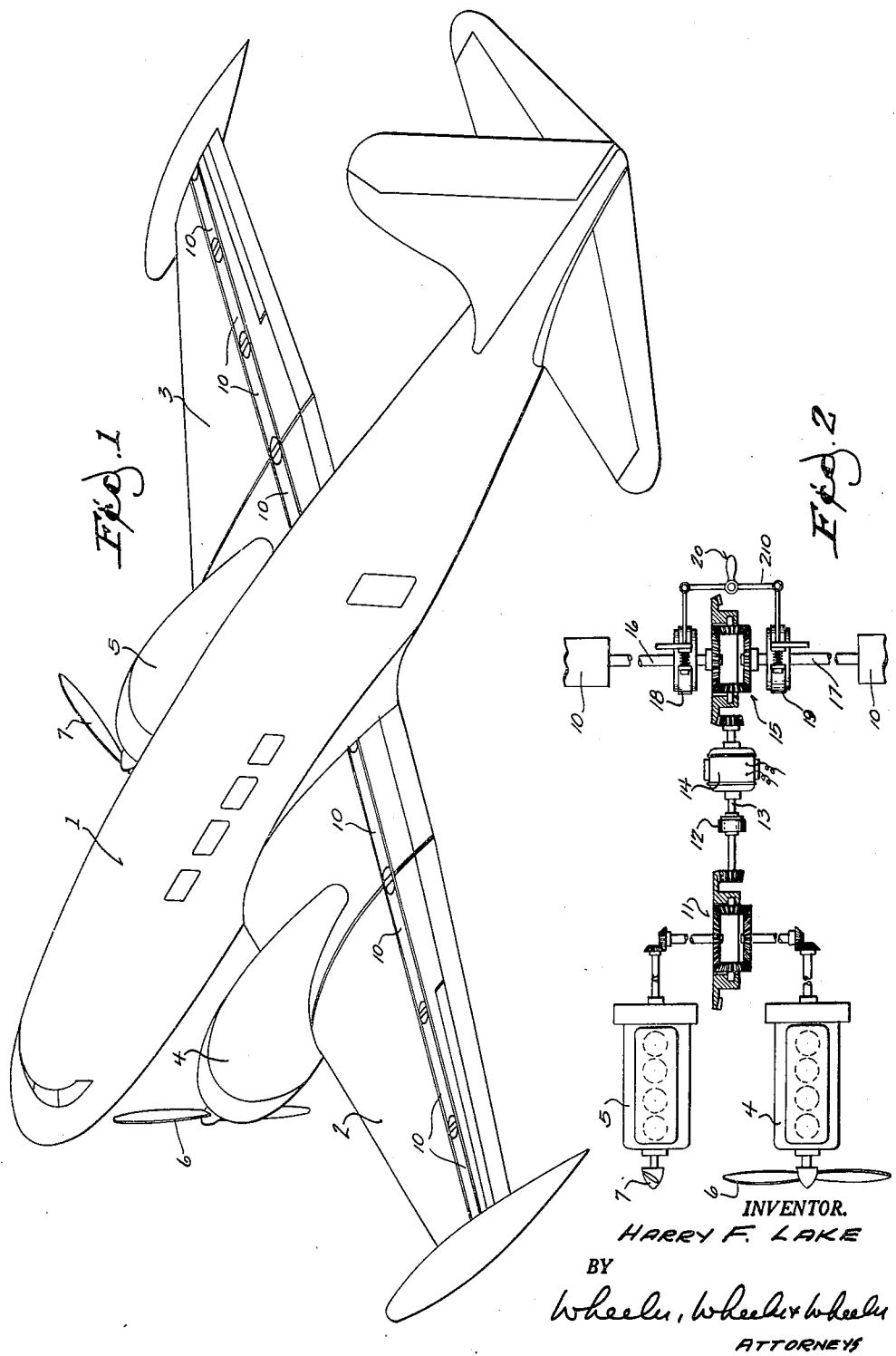

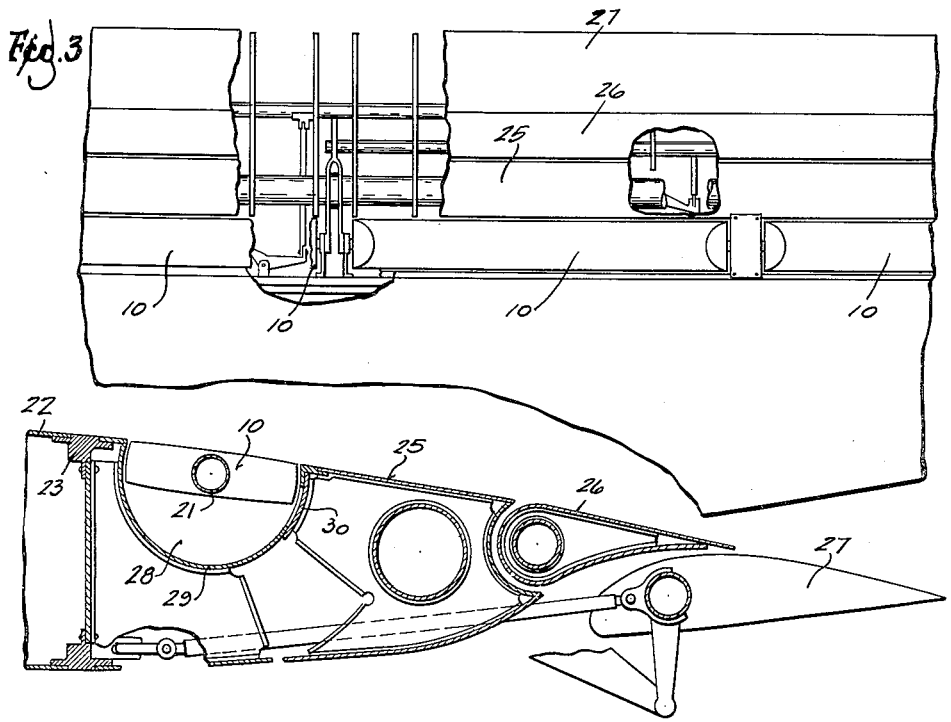
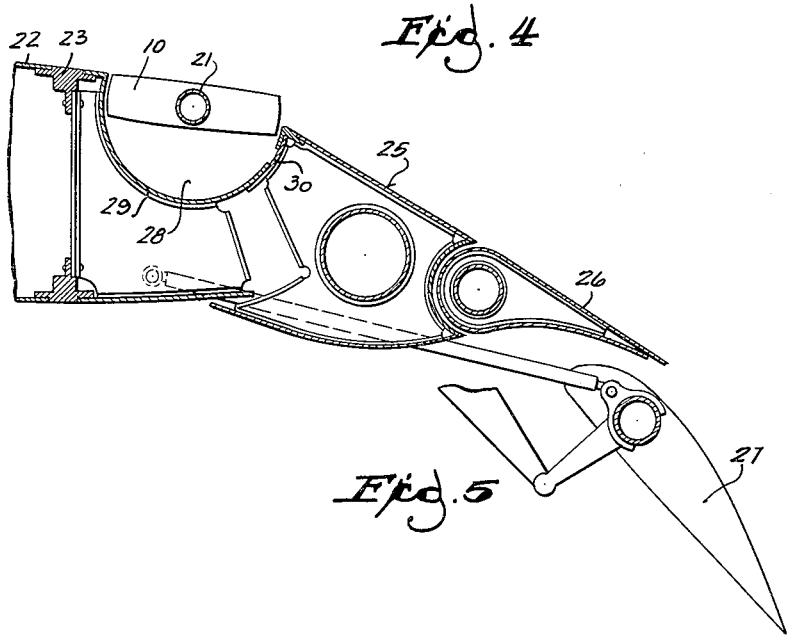

INVENTOR.
HARRY F. LAKE
BY
Wheeler, Wheeler & Wheeler
ATTORNEYS

United States Patent Office 2,973,167
Patented Feb. 28, 1961

2,973,167

AIRFOIL AND BOUNDARY-LAYER CONTROL ROTOR

Harry F. Lake, 4417 Madison St., Dearborn, Mich.

Filed Jan. 24, 1957, Ser. No. 636,177

3 Claims. (Cl. 244—42)

The present invention relates to a combination of airfoil and rotor having substantially increased efficiency in take off, flight and landing.

It is well established that the ideal requisites vary materially with each of these conditions. In take off, the circulation, or air flow, around a cambered airfoil should provide an optimum ratio of lift to drag. A thin, low cambered airfoil without surface appendages is best for level flight. For landing, a highly cambered airfoil offering minimum friction to the air flow and with yaw and roll forces beneficiently controlled at low air speeds is desirable. The present invention achieves the desired results by means of a wing rotor extending longitudinally of the airfoil for a substantial portion of its length intermediate the leading and trailing edge. Usually the rotor axis will be at or below the level of the top surface of the airfoil and the rotor will normally be bladed rather than comprising a cylinder or a series of closely spaced disks.

In some installations in which it is desired that the rotor be in continuous operation, the number of blades with which the rotor is provided is immaterial. In one embodiment, I provide a two-blade rotor so designed that when the rotor is not in operation one face of the rotor is flush with, and constitutes a part of, the upper surface of the airfoil. With the rotor in operation a strong boundary layer current flows over the airfoil. In some embodiments means is provided for stopping rotation with the rotor in the desired position, and locking it there, when the effect is not desired.

The correctly located and controlled wing rotor of this invention with its additional improvements creates a very high velocity of air flow over the entire upper surface of the airfoil even at a very high angle of attack and a low forward speed, under which condition the added support and control are of particular significance. With every increase in the angle of attack of an airfoil not so equipped, it becomes increasingly difficult to maintain the air in smooth flow over the upper surface. In this condition, the boundary layer of air thickens, resulting in decreased lift and increased drag. If carried beyond the critical angle of attack a stall results. In aircraft having the airfoil hereinafter described, this dangerous condition is for all practical purposes eliminated. This same condition of high velocity of air flow is also obtained over a highly cambered airfoil, thus greatly increasing the lift forces and decreasing the drag forces.

The effectiveness of the rotor becomes most significant in installations in airfoils having leading and trailing sections pivotally adjustable substantially about the rotor axis to positions effective to increase camber. In such installations the rotor causes air to flow smoothly across the surfaces of the airfoil sections even when such sections are adjusted to high camber positions at relatively sharp angles to each other.

It will be shown hereinafter from test information that both boundary layer control and great strengthening of the total flow of air is obtained. The boundary layer is controlled by the continual tangential output flow from the rotor while strengthening of the total flow results from the inflow to the rotor.

Tests prove that it is possible to induce and control a powerful current over the upper wing surface by means of the described wing rotor. The improvement in lift achieved by the use of the rotor is incredibly great in relation to the amount of power required to maintain the rotor in operation.

The airfoil lift is proportional to flow of air across it. Since the rotor herein disclosed is capable of effecting great increases in flow and lift in accordance with rotor speeds, some embodiments provide for relative variation in rotor speeds in respective wings to supplement or replace aileron action as a means of achieving lateral stability. This has great significance at low speeds at which ailerons become virtually useless.

It is frequently desirable to keep the rotor in operation or potentially in operation to maintain boundary layer control even in the event of failure of the main power plant. This can be done either by using an auxiliary source of power or by using the forward motion of the airfoil to actuate the wing rotor directly or through one or more propellers acting as power sources. Under these conditions, the increased lift is of great significance. It is practicable to provide auxiliary power because the power required by the rotor is very low. In order to apply all of the power input to the air of the boundary layer, the ends of the rotor are baffled to preclude axial flow.

While the invention is applicable to airfoils of the propellerless type or having pusher propellers, there appears to be a desirable interaction between the rotor and the slip stream of a tractor propeller. Consequently, organizations are preferred in which the wing rotor is so located in an airfoil that the slip stream of a tractor propeller is directed over that part of the airfoil in which the wing rotor is incorporated.

With the foregoing general objects in view, more details of which will appear as the description proceeds, the invention resides in the originality of design, combination and arrangement of parts and in the retails of construction hereinafter described and claimed, it being understood that changes in the precise embodiment of the invention herein disclosed can be made within the scope of what is claimed without departing from the spirit of the invention.

In the drawings:

Fig. 1 is a perspective view of a multimotored aircraft embodying my invention.

Fig. 2 is a diagrammatic illustration of driving connections between an engine, a propeller and a wing rotor.

Fig. 3 is a fragmentary plan view on an enlarged scale of wing rotor supporting members and supporting members for the aft wing section flaps and ailerons, parts being broken away.

Fig. 4 is an enlarged view in fore and aft section through the wing rotor, aft wing section, slot lip aileron and aileron flap in low camber positions.

Fig. 5 is an enlarged view similar to Fig. 4 showing the wing rotor, aft wing section, slot lip aileron and aileron flap in high camber positions.

Fig. 6 is a view in diagrammatic fore and aft section through a wing equipped with fins used in conjunction with rotor end disks.

Fig. 7 is a front elevational view of a wing rotor disk, the rotor being fragmentarily illustrated.

Fig. 8 is a fragmentary plan view of the wing rotor brake and detent, portions of the rotor being broken away.

Fig. 9 is a fragmentary view taken in section on line 9—9 of Fig. 8.

Fig. 10 is an enlarged fragmentary detail view in perspective showing a retractable rotor disk.

Fig. 11 is a diagram of a test graph showing the power required to operate the wing rotor.

Figure 12:
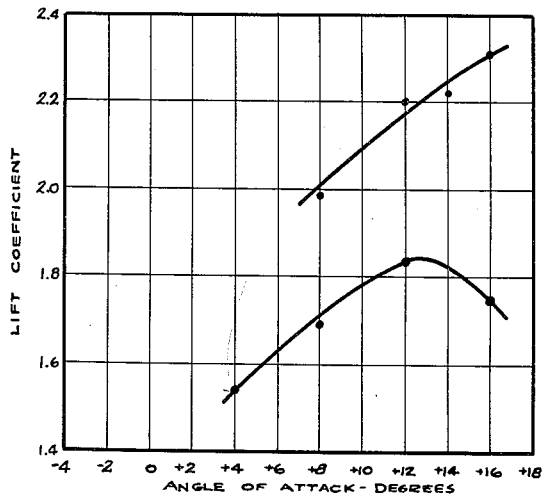
Fig. 12 is a diagram of a wind tunnel test of the lift of an airfoil section including a wing rotor.

Fig. 1 and Fig. 2 illustrate a typical installation of the invention in an airplane having a conventional fuselage 1. The wings 2 and 3 comprise airfoils of conventional construction (except for the wing rotors incorporated herein as will hereinafter be described) and conventional engine nacelles are mounted on the respective wings and house engines 4 and 5 for actuating the propellers 6 and 7.

The wing rotors 10 are mounted in the upper surface of each of the airfoils 2 and 3 and extend longitudinally of the airfoils intermediate the leading and trailing edges and are usually close to the trailing edge. The rotors here illustrated may be of the two-bladed design best shown in Figs. 6 and 7 and are desirably made up in sections extending end to end between structural members of the wing as best shown in Fig. 3. The contour of the rotor is desirably complementary with the wing contour if the rotor is designed to be at rest during flight.

Fig. 2 diagrammatically illustrates an acceptable arrangement for powering the rotors 10. When either or both of the engines are in operation, power is transmitted through the differential gearing 11 and overrunning clutch 12 and the armature shaft 13 of an electric motor 14 to another differential gear set 15. The differential gear set 15 has its individual shafts 16 and 17 connected with the respective rotors 10, either of which may be retarded by applying the appropriate brake 18 or 19 subject to the control of the handle 20 and lever 210. The manually operated lever is shown in its intermediate or neutral position in which neither brake is effective. Oscillation of the handle clockwise as viewed in Fig. 2 will apply the brake 18 leaving shaft 17 free. Counterclockwise oscillation of lever 210 will apply brake 19, leaving shaft 16 free. The object is to effect actuation of the rotors 10 and the respective wings at different rates to produce different degrees of lift either to supplement or supplant aileron action as a means of achieving lateral stability.

With neither of the engines 4 or 5 in operation, the rotors may be actuated by energizing the electric motor 14, the overrunning clutch at 12 permitting shaft 13 to operate even with the differential gear set 11 stationary. Assuming the airplane to be in flight, it is also possible for the rotors to be actuated from the propellers 6 and 7, which will continue to rotate by reason of impact of the air upon them, even though the engines 4 and 5 are idle. Under these circumstances, the rotors will continue to function during continued forward movement of the plane even with both of the engines 4 and 5 dead and the motor 14 deenergized.

The particular wing structure is, of course, broadly immaterial. The disclosure in this regard, therefore, is to be deemed illustrative only. As shown in Figs. 3, 4 and 5, the forward section of the airfoil 3 is conventional. Figs. 4 and 5 show sections through a main spar 23 at the rear of the forward airfoil section. The aft wing section 25 is conventionally pivoted behind the spar 23 for movement between the low camber position of Fig. 4 and the high camber position of Fig. 5. The slot flap 26 and the aileron flap 27 are, in turn, pivoted to the aft wing section 25 in the conventional fashion and provided with any appropriate operating connections. With these parts the present invention is not concerned except in so far as the particular location of the airfoil rotors 10 permits them to control the boundary layer and direct air flow smoothly across the airfoil surfaces notwithstanding the angle of the hinged connection between them.

For the purpose of such control, a channel 28 is provided at or closely adjacent to the hinged connection between airfoil sections. The two sections here involved are the forward wing section 22 and the aft wing section 25. The channel 28 is formed in part by a tubular segment 29 having fixed connection with spar 23 and a lapping segment 30 which is fixed to the hingedly movable aft section 25 and has a radius corresponding to that of the segment 29 to maintain the channel substantially closed in all positions of the aft wing section.

The rotor shaft 21 is desirably at the axis about which channel segments 29 and 30 are concentric and it is also desirably coaxial with the hinge axis upon which the aft airfoil section 25 is adjustable. In this embodiment, the shaft 21 is located sufficiently below the top surface of the airfoil so that the rotor 10 will, in normal operation, have its upper surface flush with the rotor. It may be held in this low drag position during normal flight in any desired manner. For example, the rotor shaft 21 may carry arms 32 provided with magnetic armature members 33 to be attracted by opposed electromagnets 34 and 35 when the latter are energized.

Figure 13:
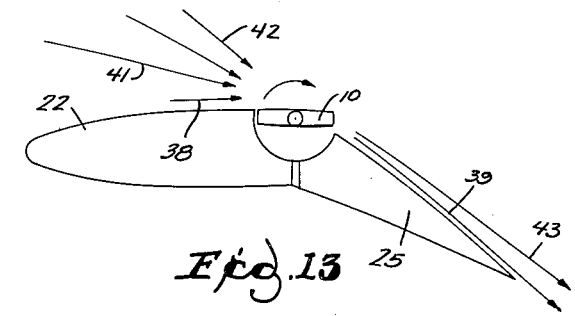
Fig. 13 is a diagrammatic sectional view of an airfoil showing the direction of flow induced thereover during rotor operation.

With any mechanical or electrical detent means inoperative, and the rotor actuated by power in a direction such that as the vanes are exposed above the channel they rotate in a direction from front to rear of the airfoil, air will be caused to move rearwardly over that portion of the airfoil which is ahead of the rotor and rearwardly and downwardly across that portion of the airfoil which is at the rear of the rotor, notwithstanding a sharp angular relationship between these airfoil sections. Air flow will occur along the surface of airfoil section 22 as indicated by the arrow 38 in Fig. 13. Boundary air flow will occur along the aft airfoil section 25 as indicated by arrow 39. In addition, so much air will be drawn from above the forward airfoil section 22 as to create very substantial lift over this section. This lift can be satisfied only in part by the upward movement of the airfoil and additional air flow will occur from above as indicated by arrows 41 and 42. Flow from the rotor rearwardly will occur not only along the surface of the aft section 25 of the airfoil, but also in a direction deviating from that section as indicated by the arrow 43 in Fig. 13, thus creating additional lift.

It has been found that the uniform character of this flow is greatly impeded if air is permitted to flow axially into the spaces between the vanes of the rotor. To preclude such axial flow, the channel 28 may be closed, if desired, at each end of each rotor. Assuming that the rotors are made in sections as best shown in Figs. 3 and 10, flaps 47 and 48 may be hinged to respective sections for movement by centrifugal force from the normally collapsed position in which they tend to be held by leaf springs 46 as shown in full lines in Fig. 10. The erected position which these flaps may assume during rotor operation is shown in dotted lines in that view. In the erected position of these flaps, they will act as baffles to preclude axial movement of the air to or from the rotors. Fig. 6 and Fig. 7 show a modified embodiment in which the rotor shaft terminal bearing portion 210 (Fig. 7) carries a baffle disk 45 which rotates with the rotor 10. The relatively movable airfoil sections 22 and 25 may have fins 44 and 440 in the plane of the disk 45.

It being desired that all of the energy used in rotor operation shall create movement of air from the front of each airfoil to the rear thereof, it will be evident that any air entering or leaving axially will waste this energy and detract from the desired effect.

The rotors have, of course, a tendency to expel air centrifugally. The forward movement of the airfoil, and the slip stream from a tractor propeller, if any, fill the spaces between rotor vanes as these spaces are exposed by the emergence of the vanes from the channels in which the rotors operate. As the air between vanes is acted on by the vanes to achieve the angular velocity of the rotor, it tends to become expelled centrifugally. Such centrifugal expulsion appears to occur with a rather sharp cutoff as the vane passes into the channel at the surface of the aft airfoil section. There is probably a reduced pressure between vanes as the vanes traverse the channel so that, upon emergence, air is drawn into the spaces between vanes to create rearward flow over the forward section of the airfoil as has been found to exist in tests of the device. Whether or not the foregoing theory of operation is correct, it is a fact that very pronouncedly increased boundary layer movement occurs when the rotor is in operation and very substantial increases in lift are caused.

Reference to Fig. 12 shows that in wind tunnel tests the lift reached maximum at the stated wind tunnel air speed when the angle of attack of the airfoil reached 12°, with the rotor stationary. With the rotor in operation, the lift continued to increase to an angle of attack of 16° and was still continuing to rise at the conclusion of these tests.

The potentials appear to be even more significant than indicated by these test results, since it is indicated in further work with the rotor that a higher speed of rotor operation results in even greater increases. (See Fig. 11.) Yet the amount of power required for rotor operation is nominal as compared with these results, this being shown clearly in Fig. 11.

Figures 14, 15:
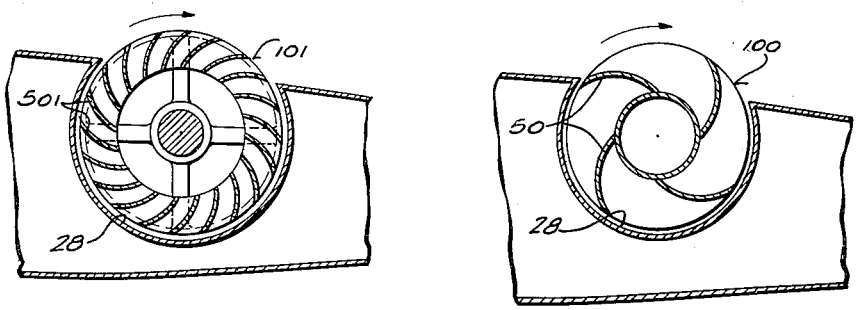
Fig. 14 is a sectional view of an alternative form of rotor.
Fig. 15 is a sectional view of a further alternative rotor form.

Only if it be desired that the rotor be stationary during some periods of flight is it expedient to use a two-bladed rotor such as that shown at 10. Merely by way of exemplification of the fact that the number of blades and their form may be varied as desired, I have shown in Fig. 14 a rotor 100 which comprises a number of blades 50, which like the blades of some blower fans, have been given a rake rearwardly with respect to the direction of rotation. Fig. 15 shows a rotor 101 with a number of blades 501 which is still further increased. These blades, like the blades of some blower fans, have been given a forward rake with respect to the direction of rotation. Any one of these arrangements is effective to produce pronounced boundary layer flow along the surface of the wing as above described.

While the invention is believed to be of the utmost significance in airfoils of variable camber where its use at the end between adjustable sections of the airfoil causes the boundary layer flow to follow the airfoil surfaces closely notwithstanding the sharp variation in angle, thus achieving superior lift results, it is desired to emphasize that the invention has general application to airfoils of fixed camber as well as to airfoils of variable camber. In all instances, its use causes increased boundary layer flow as well as increased total flow over the airfoils and a very greatly increased lift, particularly at high angles of attack.

As above stated, this is believed to be attributable to the fact that air discharged from the rotor appears to occur as successive vanes approach the cutoff point at which they are about to enter the channel. Since that cutoff point is defined by a channel edge which is connected with the angularly adjustable air flow section, the cutoff point will vary with the position of that section and the flow, consequently, appears to take place across the face of the section in all positions thereof. Experiments indicate that considerable variation in rotor position is possible, but the preferred position is immediately behind the main spar in a location which is considerably closer to the trailing edge of the airfoil than to the leading edge thereof and may, for example, approximate about three-fifths of the distance rearwardly from the leading edge to the trailing edge. This illustration is made by way of example and not by way of limitation.

Because the additional lift produced by rotor operation is so closely related to the speed of rotor operation as is clearly shown in Fig. 11, it is possible to vary the lift of the respective airfoils of an airplane by simply varying the relative speed of operation of the rotors. This may be done to any desired degree by applying the brake to one of the rotors as suggested in Fig. 2, thereby operating the other at an increased rate of rotation. Due to the fact that they are shown as driven through a differential gear set, the complete stoppage of either rotor will operate the other at twice the normal speed. Any desired intermediate relative rate of operation can be had through this simple mechanism. The control of lift achieved in this manner makes it possible to dispense completely with ailerons if desired. At extremely slow speed operation, as in landing, the ailerons become increasingly ineffective as the speed is reduced. It is, therefore, of great value from the standpoint of safety to make tailspins virtually impossible and to maintain full lateral stability at any speed by simply regulating the relative rate of operation of the rotors.

I claim:

1. The combination with an airfoil having a leading edge and a trailing edge defined with reference to the air movement to which it is subject, said airfoil having a channel disposed between said edges and opening only to the upper surface of the airfoil and peripherally closed in a downward direction, said channel having a substantial extent transversely of the direction of air movement, a rotor disposed within the channel and comprising a hub portion and vanes, the vanes normally being flush with the top surfaces of the airfoil and disposed at a level to project from the channel as the rotor rotates, driving means independent of the air stream to which the airfoil is subject for actuating the rotor in a direction of rotation such that exposed portions move in the direction of air movement across the airfoil between, said edges.

2. The device of claim 1 in further combination with means for arresting rotor movement in the said normal position of said rotor in which upper surfaces of its vanes are flush with adjacent upper surfaces of the airfoil.

3. The combination set forth in claim 1 in which the airfoil comprises movable fore and aft sections respectively having the leading edge and trailing edge aforesaid and provided with a pivotal connection substantially coaxial with said rotor.

References Cited in the file of this patent

UNITED STATES PATENTS

| | | |
|---|---|---|
| 1,634,167 | Wilson | June 28, 1927 |
| 2,173,832 | Fahrney | Sept. 26, 1939 |
| 2,421,757 | Oetzel | June 10, 1947 |
| 2,569,983 | Favre | Oct. 2, 1951 |

FOREIGN PATENTS

| | | |
|---|---|---|
| 23,717 | Great Britain | June 2, 1910 |
| 233,083 | Great Britain | May 7, 1925 |
| 924,717 | France | Mar. 10, 1947 |